(12) United States Patent
Ramer

(10) Patent No.: US 7,394,183 B2
(45) Date of Patent: Jul. 1, 2008

(54) KINETIC MICRO-GENERATOR: A METHOD OF GENERATING ELECTRICAL CURRENT VIA MAGNETOSTRICTION AND THE PIEZOELECTRIC EFFECT

(75) Inventor: Jon Vincent Ramer, San Pedro, CA (US)

(73) Assignee: Jon V. Ramer

( * ) Notice: Subject to any disclaimer, the term of this patent is extended or adjusted under 35 U.S.C. 154(b) by 89 days.

(21) Appl. No.: 11/515,265

(22) Filed: Sep. 5, 2006

(65) Prior Publication Data

US 2007/0096603 A1  May 3, 2007

Related U.S. Application Data

(60) Provisional application No. 60/732,059, filed on Nov. 2, 2005.

(51) Int. Cl.
*H01L 41/113* (2006.01)
*H01L 41/06* (2006.01)
*H01L 41/20* (2006.01)

(52) U.S. Cl. .................. 310/339; 310/26; 310/367; 310/369

(58) Field of Classification Search .......... 310/26, 310/339, 367, 369
See application file for complete search history.

(56) References Cited

U.S. PATENT DOCUMENTS

| | | | | | |
|---|---|---|---|---|---|
| 3,160,769 | A | * | 12/1964 | Abbott | 310/26 |
| 3,539,841 | A | * | 11/1970 | Riff | 310/339 |
| 4,742,499 | A | * | 5/1988 | Butler | 367/155 |
| 5,029,873 | A | * | 7/1991 | Davis | 273/376 |
| 5,188,447 | A | * | 2/1993 | Chiang et al. | 362/103 |
| 7,078,850 | B2 | * | 7/2006 | Sakai | 310/339 |

* cited by examiner

*Primary Examiner*—Thomas M Dougherty

(57) ABSTRACT

An apparatus constructed from a combination of a magnetic north orienting lodestone, magnetostrictive ferrogel, and piezoelectric crystals can generate electrical current when exposed to kinetic motion. The apparatus is built in the shape of a geodesic sphere with two sections, an inner sphere with a lodestone in the center surrounded by outward-facing magnets, and an outer sphere with sections of stacked magnetostrictive ferrogel and piezoelectric crystals interspaced with inward-facing magnets. Upon the apparatus being given a kinetic impulse, the inner sphere will orient to magnetic north, which will cause the outward-facing magnets to pass next to stacks of ferrogel/piezoelectric crystals. The ferrogel will react by physically changing in size, imparting an impulse to the piezoelectric crystal, which will in turn release a pulse of electrical current.

1 Claim, 3 Drawing Sheets

FIG 1. Internal Structure of Inner Sphere.
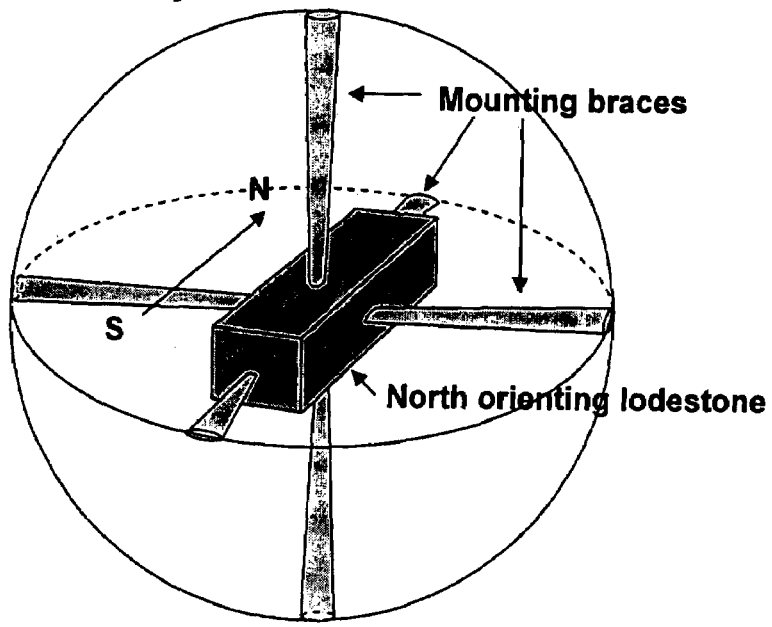
FIG 2. Surface of Inner Sphere
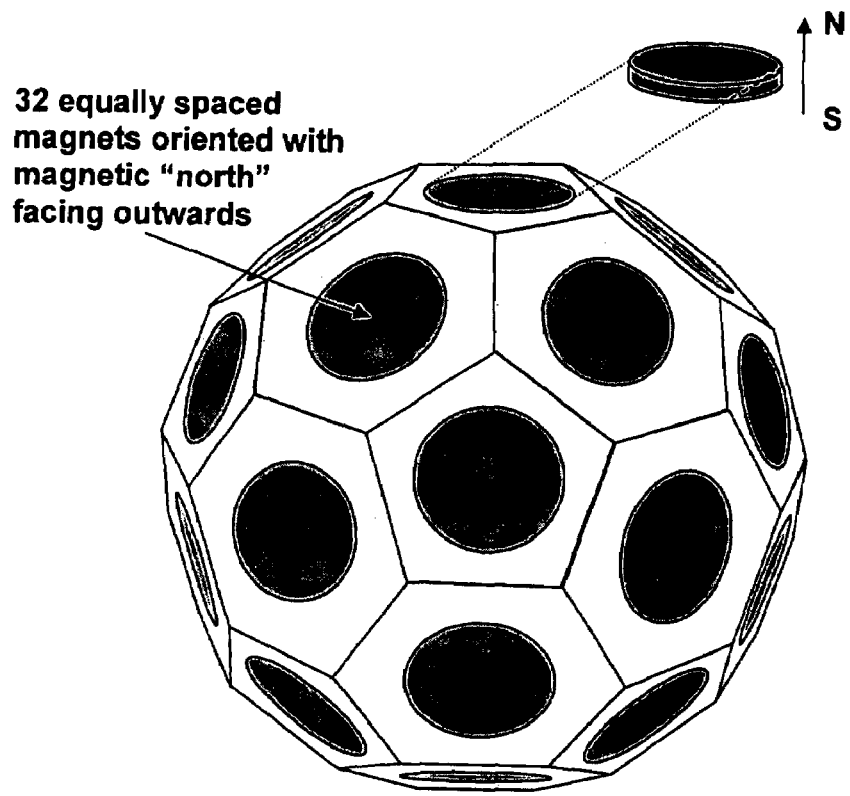

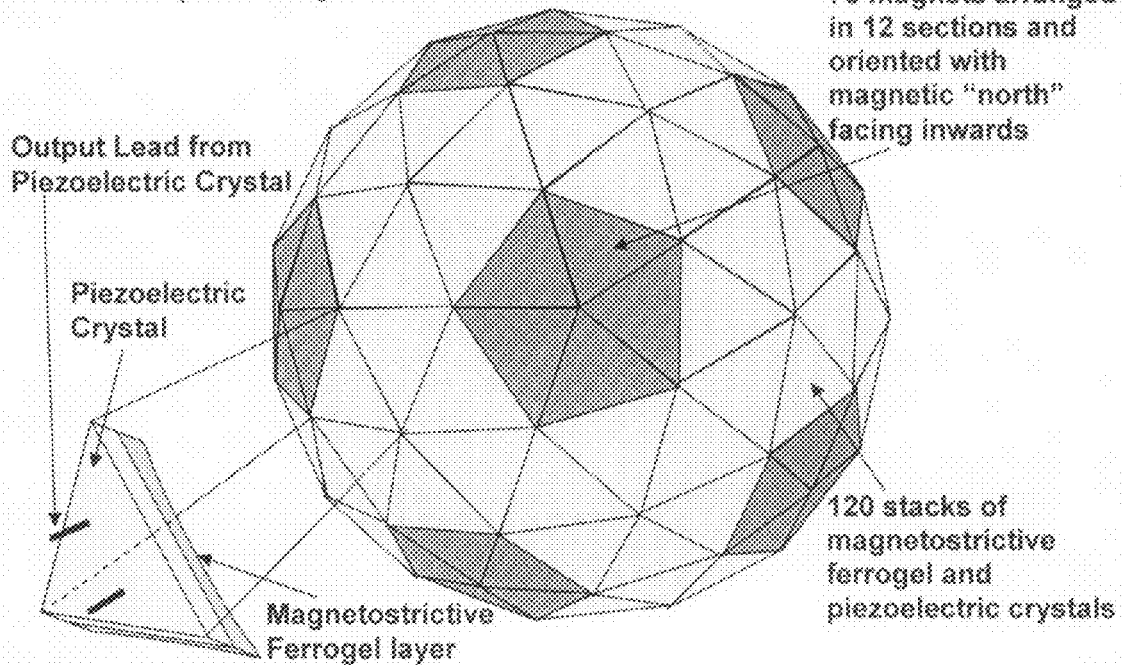
FIG 3. Outer Sphere Configuration.
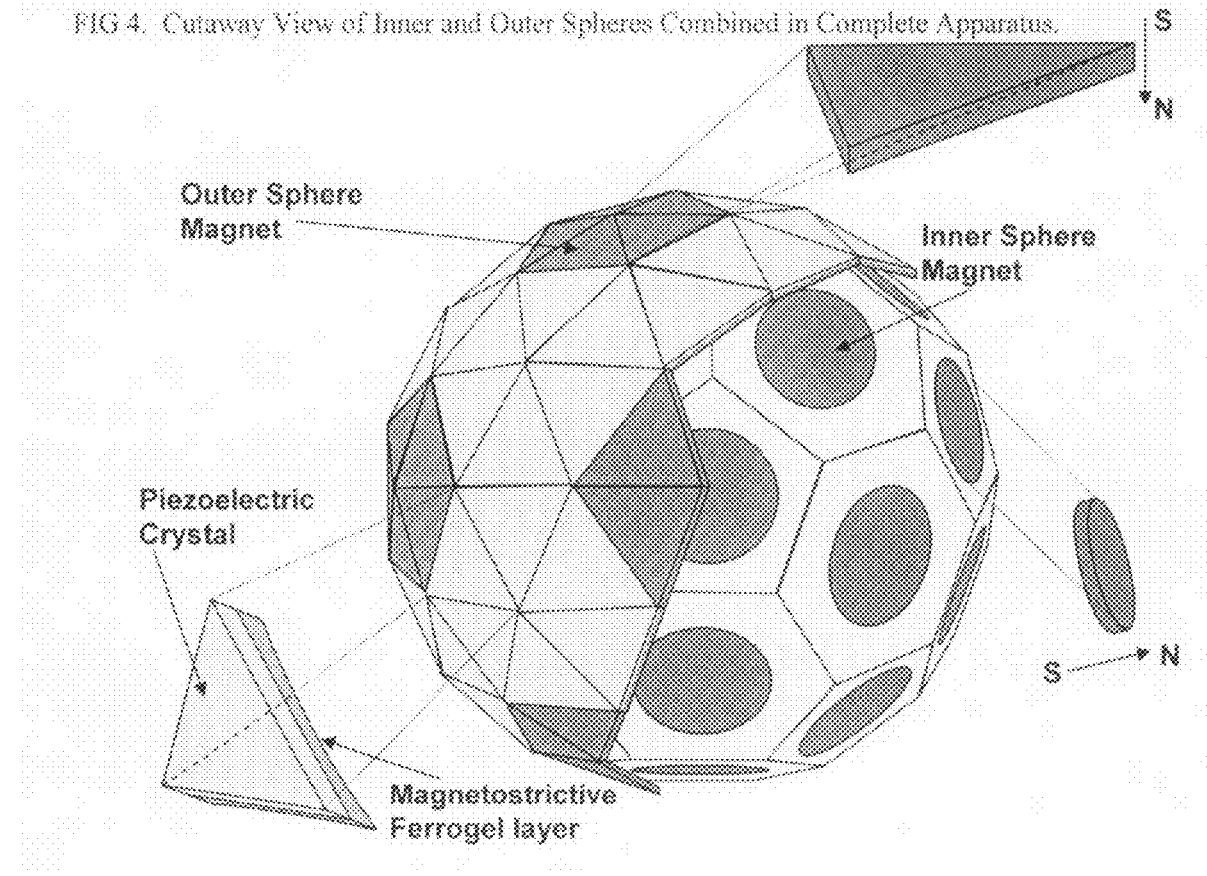
FIG 4. Cutaway View of Inner and Outer Spheres Combined in Complete Apparatus.

FIG 5. Circuit Diagram of Apparatus.
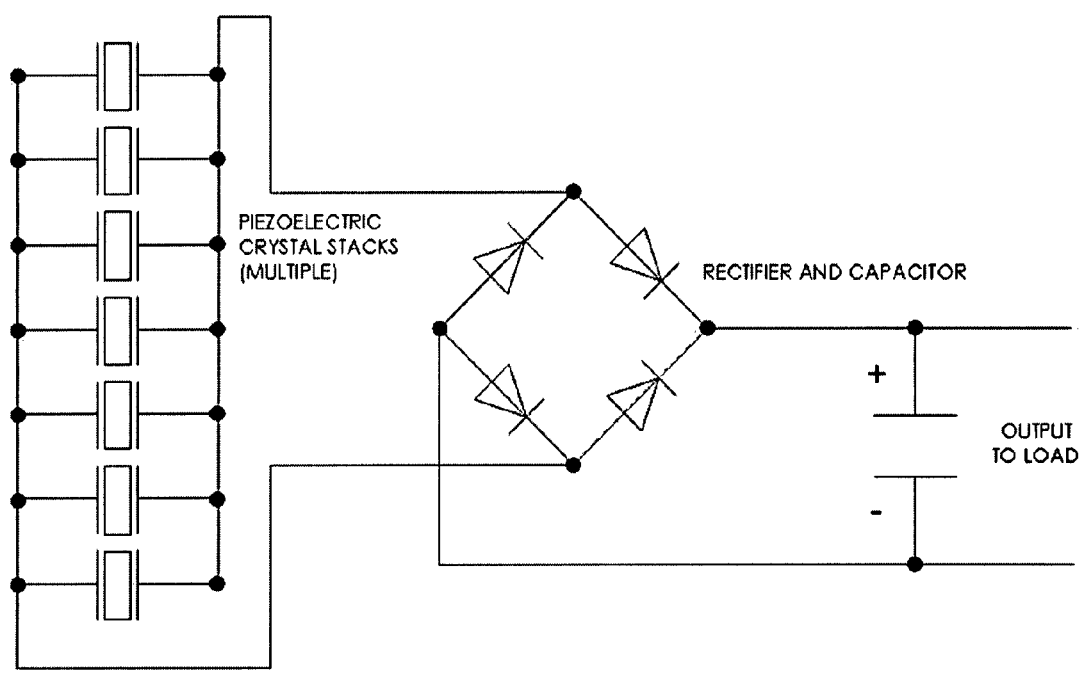

KINETIC MICRO-GENERATOR: A METHOD OF GENERATING ELECTRICAL CURRENT VIA MAGNETOSTRICTION AND THE PIEZOELECTRIC EFFECT

RELATED APPLICATIONS

This patent application is a continuation of and claims priority from U.S. provisional application 60/732,059 filed Nov. 2, 2005.

FIELD OF THE INVENTION

This invention pertains generally to the field of micromechanical electrical generation.

BACKGROUND OF THE INVENTION

A lodestone, either naturally occurring or man-made, will, if given freedom of movement, always orient itself along the Earth's magnetic field lines. Magnetostriction is the principle where a material with the correct properties will physically change shape when exposed to a magnetic field. Ferrogel is a gelatinous compound with magnetostrictive properties. A piezoelectric crystal will generate a spike of electrical current when physically deformed.

SUMMARY OF THE INVENTION

An apparatus built in the shape of a geodesic sphere with two sections, an inner sphere with a lodestone in the center surrounded by outward-facing magnets, and an outer sphere with sections of stacked magnetostrictive ferrogel and piezoelectric crystals interspaced with inward-facing magnets. The apparatus is called a kinetic micro-generator (KMG) by the inventor. Potential uses for the KMG would be to recharge cellular telephone batteries, remote control units, portable data handhelds, or any mobile electronic or battery powered item.

BRIEF DESCRIPTION OF THE DRAWINGS

In the drawings:

FIG. 1 is a view of the internal structure of the inner sphere of the invention.

FIG. 2 is a view of the outer surface of the inner sphere of the invention.

FIG. 3 is a view of the outer sphere of the invention.

FIG. 4 is a cutaway view of how the inner and outer spheres interact.

FIG. 5 is an electronic circuit diagram of the apparatus.

DETAILED DESCRIPTION OF THE INVENTION

The attached drawings are to demonstrate the principles of the apparatus. The number of magnets and ferrogel/piezoelectric crystal stacks can vary depending upon application.

As shown in FIG. 1, a lodestone is braced in the center of the inner sphere. The shell of the inner sphere, FIG. 2, is composed of a non-magnetic, lightweight material, with 32 small magnets spaced out equally on the surface with the "north" end of the magnet facing outwards. The entire surface is machined as close to a smooth sphere as possible. The distance between the magnets on the inner sphere should be slightly larger than the size of the ferrogel/piezoelectric crystal stacks on the outer sphere, shown in FIG. 3. The outer sphere is composed of 120 separate magnetostrictive ferrogel/piezoelectric crystal stacks interspaced with 70 small magnets with the "north" end of the magnet facing inward. By orienting the magnets on both spheres with the "north" ends towards each other, the magnets will repel each other, keeping the inner sphere free from touching the outer sphere at any point. The inside of the outer sphere should also be machine as close to a smooth sphere as possible. FIG. 4 depicts how the inner and outer spheres are constructed together. The inner and outer spheres should be constructed so the gap between them is slightly smaller than the distance where the repulsive forces of the inner and outer magnets interact, thus using magnetic repulsion to keep the spheres apart. When the apparatus is exposed to kinetic motion the lodestone at the center of the inner sphere orients to Earth's magnetic north, and will cause the magnets of the inner sphere to pass near the magnetostrictive ferrogel/piezoelectric crystal stacks of the outer sphere, generating up to 120 spikes of electrical current in varying strengths. FIG. 5 shows how connecting each of the 120 stacks to a rectifier-capacitor assembly will smooth the current spikes into a steady DC output for possible use or storage in a battery.

It is understood that the invention is not confined to the particular embodiments set forth herein as illustrative, but embraces all such modifications thereof as come within the scope of the above claims.

The invention claimed is:

1. An electrical current generator apparatus comprising: a magnetic north orienting lodestone; a rectifier and capacitor assembly; an inner sphere; and, an outer sphere; wherein said inner sphere has said lodestone mounted within it such that it will always orient to the Earth's magnetic north; said inner sphere further including outward-facing magnets positioned on it's surface at specific locations; said outer sphere including inward-facing magnets at specific locations in opposition to said magnets of said inner sphere; wherein said outward-facing magnets of said inner sphere will magnetically repel said inward-facing magnets of the outer sphere causing said inner sphere to float freely and allowing said loadstone to orient to the magnetic north no matter the orientation of the apparatus; said outer sphere further including magnetostrictive ferrogel/piezoelectric crystal stacks at specific location; wherein when said inner sphere and said outer sphere are in motion relative to each other, the outward-facing magnets on said inner sphere will pass near said magnetostrictive ferrogel/piezoelectric crystal stacks; said magnetostrictive ferrogel reacts to the close passage of the magnets with a physical change in size that said magnetostrictive ferrogel imparts a physical impulse to the piezoelectric crystal; wherein the physical impulse on said piezoelectric crystal allows current carriers formed on said piezoelectric crystal to generate electrical current to said rectifier and capacitor assembly which provides a steady stream of electricity until said apparatus reaches a steady state of no relative motion between said inner and outer spheres.

* * * * *